July 27, 1937.                C. J. McDONALD                2,088,089
                    GAS CONTROL FOR BEER DRAW-OFF SYSTEMS
                             Filed Aug. 12, 1935
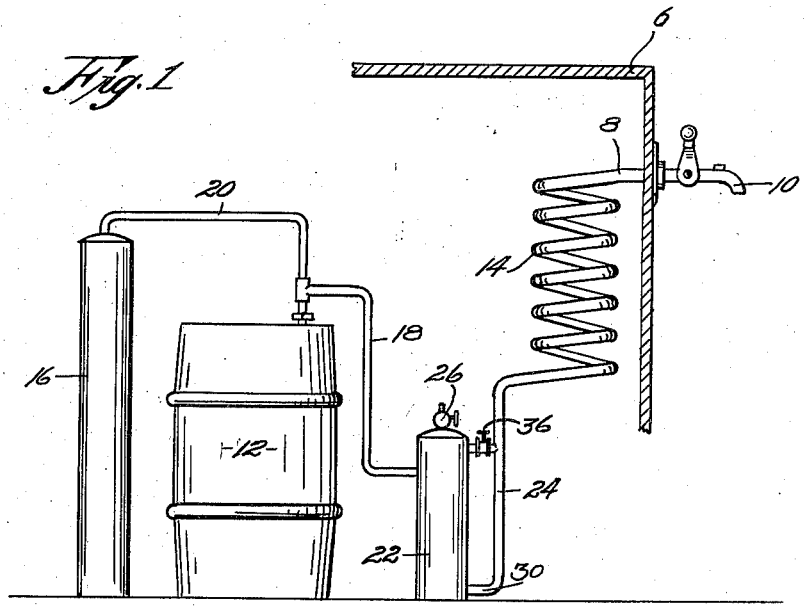
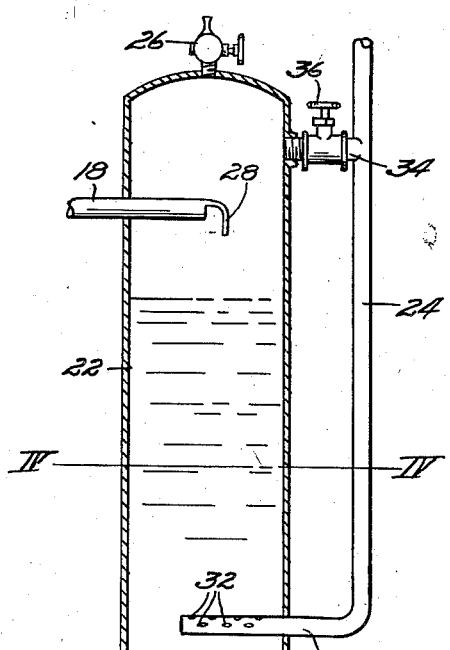
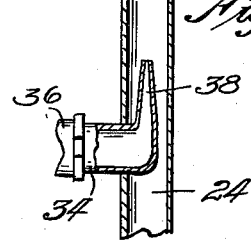
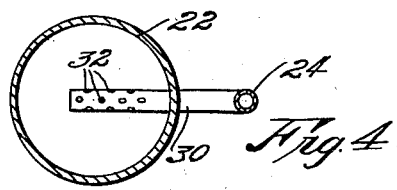
INVENTOR,
Charles J. McDonald.
BY
ATTORNEYS.

Patented July 27, 1937

2,088,089

UNITED STATES PATENT OFFICE 2,088,089

GAS CONTROL FOR BEER DRAW-OFF SYSTEMS

Charles J. McDonald, Chicago, Ill.

Application August 12, 1935, Serial No. 35,793

5 Claims. (Cl. 225—17)

This invention relates to liquid dispensing systems and particularly control apparatus for beer draw-off systems and the primary object of the invention is the provision in such a system of means whereby the collar or amount of foam on any given quantity of beer or similar liquid might be determined through the setting of valves and other mechanism which forms a part of the control unit.

One of the primary objects of this invention is the provision in beer draw-off systems of an auxiliary control tank wherein the beer and pressure creating gas is separated and from which the two elements may be withdrawn in quantities suitable to the operator.

A yet further aim of this invention is the provision of a control for beer draw-off systems which has as a part thereof a uniquely formed tank and means in association therewith that are specifically formed to the end that the beer and gas are effectively separated and then withdrawn from the tank so that the proper amount of intermixing occurs and further to the end that simultaneous withdrawing of gas and beer from the tank might be controlled for the purpose of establishing a predetermined amount of foam upon the container of beer which is sold to the customer.

Many minor objects of the invention will appear during the course of the following specification referring to the accompanying drawing wherein, Fig. 1 is a diagrammatical view showing a beer draw-off system with the control unit made in accordance with this invention in position.

Fig. 2 is an enlarged vertical, central section through the tank forming the main element of the control.

Fig. 3 is an enlarged fragmentary, detailed, sectional view through the zone of connection between the branch pipe and the main pipe which connect with the tank, and Fig. 4 is a cross sectional view through the tank taken along line IV—IV of Fig. 2.

In referring to the drawing wherein one illustrated embodiment of the invention is shown, like reference characters will be employed to designate similar parts and the numeral 6 indicates an ordinary counter or housing through which passes pipe 8 to terminate at a faucet 10 by means of which the operator may withdraw beer from keg 12 through the coil of pipe 14 and other parts to be more fully hereinafter set down.

Beer from keg 12 is forced to faucet 10 by the pressure of gas which is established in cylinder 16 and the means for interconnecting cylinder 16, keg 12 and faucet 10 is well known in the art. Pipes 18 and 20 serve to connect the control tank 22 with the keg 12 and a pipe 24 joins coil 14 with tank 22. Pipe 20 may enter keg 12 at any point in the top thereof or with pipe 18 through a connection which allows the simultaneous entrance and exit of gas and beer respectively. Such a bung attachment is disclosed in principle in U. S. Patent No. 710,631, dated October 7, 1902.

This tank 22 is especially and uniquely formed and its function is to first separate the gas from the beer and then to allow the operator to simultaneously withdraw both gas and beer from the tank in predetermined quantities. To this end, the tank 22 must be specifically created to have a release valve 26 located at the top thereof and which may be either automatically or manually controlled.

Pipe 18 enters the side of tank 22 and terminates inside the same as illustrated in Fig. 2. An apron 28 extends downwardly across the open end of pipe 18 and in spaced relation thereto so that a baffling and breaking up occurs when the beer under pressure is forced into tank 22. Upon such separation, the beer settles into the bottom of tank 22 and the level thereof is usually maintained at the line shown in the drawing. The portion of tank 22 above this level is obviously filled with the gas and if the pressure within tank 22 becomes too high, valve 26 may be manipulated for the purpose of release. Beer is withdrawn from tank 22 through pipe 24 which leaves tank 22 from a point adjacent the bottom thereof and since the beer within tank 22 sometimes settles and allows foreign matter to fall to the bottom of tank 22, pipe 24 is especially formed so that a horizontal portion 30 thereof, enters tank 22 and is provided with a series of perforations 32 along the upper side thereof. The horizontal portion 30 of pipe 24 is closed at its inner end and beer may pass into pipe 24 only through perforations 32. Manifestly the movement of beer into the pipe through these perforations 32 will not cause an agitation of any settlings or the like which may be deposited in the bottom of the tank 22.

The arcuate apron 28 causes removal of only a part of the $CO_2$ gas from the beer. That amount remaining is never enough to create a "collar" too great in width and since the valve 36 may add more or less gas from the top of tank 22 the width of a collar of foam may be varied to a greater or lesser extent over the one normally formed if valve 36 were closed entirely.

In order that beer passing through pipe 24 may have a predetermined amount of gas therein for the purpose of forming a foam on the top of the stein or glass thereof, a branch pipe 34 interconnects pipe 24 and the upper part of tank 22. This branch has a valve 36 interposed therein and the manipulation of this valve will determine the amount of gas which enters the stream of beer passing along through pipe 24. The end of branch pipe 34 which connects with pipe 24 is formed as shown in Fig. 3 and the nozzle 38 which is inside of pipe 24, is made so that the gas is injected into the stream of beer in the direction of travel of the same. The opening and closing of valve 36 will increase or decrease the amount of gas entering the stream of beer and therefore, the size of "collar" may be determined by the operator. It is notable that the "collar" on a given glass of beer will be the same depth at all times when the system is in perfect working order and the unit just described when interposed in a beer draw-off system, will not only save a vast amount of normally wasted beer, but will allow the operator of the system to definitely know exactly the condition of the beer which he is serving.

It is understood that changes with respect to specific structure might be made in building this system without departing from the spirit of the invention or scope of the appended claims.

Having thus described the invention, what is claimed as new and desired to be secured by Letters Patent is:

1. In a beer draw-off system of the character described having means for dispensing the beer under pressure, a tank positioned in the system for receiving the beer and separating a part of the pressure-imparting gas therefrom; a pipe extending into said tank adjacent the top thereof having a downturned arcuate apron at the end thereof to promote separation of a certain amount of gas from beer entering the tank through said pipe; a pipe extending from within said tank at a point adjacent the bottom thereof for withdrawing beer from the tank; and a branch pipe joining the upper part of said tank with said pipe for permitting gas to pass from the upper part of the tank into the beer passing through the pipe from the lower part of the tank, said branch pipe terminating within the said pipe extending from within said tank and having a nozzle thereon disposed on the longitudinal axis of the last mentioned pipe whereby to release gas at the center of the stream of beer passing therethrough.

2. In a beer draw-off system of the character described having means for dispensing the beer under pressure, a tank positioned in the system for receiving the beer and separating a certain amount of the pressure-imparting gas therefrom; a pipe extending into said tank adjacent the top thereof having an apron at the end thereof to promote such separation of gas and beer entering the tank through said pipe; a pipe extending from within said tank at a point adjacent the bottom thereof for withdrawing beer from the tank; and a branch pipe joining the upper part of said tank with said pipe for permitting gas to pass from the upper part of the tank into the beer passing through the pipe from the lower part of the tank, said pipe extending from the lower part of the tank having a plurality of perforations formed in the wall along the upper portion thereof.

3. In a beer draw-off system of the character described having means for dispensing the beer under pressure, a tank positioned in the system for receiving the beer and separating a certain amount of the pressure-imparting gas therefrom; a pipe extending into said tank adjacent the top thereof having an apron at the end thereof to promote such separation of gas and beer entering the tank through said pipe; a pipe extending from within said tank at a point adjacent the bottom thereof for withdrawing beer from the tank; and a branch pipe joining the upper part of said tank with said pipe for permitting gas to pass from the upper part of the tank into the beer passing through the pipe from the lower part of the tank, said branch pipe having a valve interposed therein to control the amount of gas entering the beer being withdrawn from the lower part of the tank.

4. In a beer draw-off system of the character described having means for dispensing the beer under pressure, a tank positioned in the system for receiving the beer and separating a certain amount of the pressure-imparting gas therefrom; a pipe extending into said tank adjacent the top thereof having an apron at the end thereof to promote such separation of gas and beer entering the tank through said pipe; a pipe extending from within said tank at a point adjacent the bottom thereof for withdrawing beer from the tank; and a branch pipe joining the upper part of said tank with said pipe for permitting gas to pass from the upper part of the tank into the beer passing through the pipe from the lower part of the tank, said branch pipe extending into the said pipe carrying beer from the lower portion of the tank and terminating in a nozzle formed to direct gas in the direction of flow of the beer.

5. In a beer draw-off system of the character described having means for dispensing the beer under pressure, a tank positioned in the system for receiving the beer and separating a certain amount of the pressure-imparting gas therefrom; a pipe extending into said tank adjacent the top thereof having an apron at the end thereof to promote such separation of gas and beer entering the tank through said pipe; a pipe extending from within said tank at a point adjacent the bottom thereof for withdrawing beer from the tank; and a branch pipe joining the upper part of said tank with said pipe for permitting gas to pass from the upper part of the tank into the beer passing through the pipe from the lower part of the tank, said pipe extending from the lower part of the tank being positioned horizontally within the tank above the bottom thereof and having a plurality of perforations formed along the upper wall thereof within the tank whereby to withdraw beer without agitation of lowermost portion of the beer.

CHARLES J. McDONALD.